Nov. 17, 1970  H. O. S. LANGSTRÖM  3,540,785

ROLLING BEARING

Filed Oct. 28, 1968

INVENTOR:
HAKON OLOF SCHEIBE LANGSTRÖM
BY Howson & Howson
ATTYS.

United States Patent Office 3,540,785
Patented Nov. 17, 1970

3,540,785
ROLLING BEARING
Hakon Olof Scheibe Långström, Goteborg, Sweden, assignor to Aktiebolaget Svenska Kullagerfabriken, Goteborg, Sweden, a corporation of Sweden
Filed Oct. 28, 1968, Ser. No. 770,981
Claims priority, application Sweden, Oct. 27, 1967, 14,707/67
Int. Cl. F16c *1/24, 33/46*
U.S. Cl. 308—187                                1 Claim

ABSTRACT OF THE DISCLOSURE

A tapered rolling bearing assembly comprising inner and outer ring members having spaced apart raceways, a plurality of tapered rollers in the annular space between the ring members, a cage having an axial web portion with a plurality of circumferentially spaced window-like openings for spacing the rollers, said web portion being disposed above a plane through the center of rotation of the rollers toward the outer ring, a radially inwardly directed continuous flange projecting inwardly from opposite ends of said web portion and terminating closely to the inner ring adjacent opposite axial ends, one of said flanges at the large end of the rollers consisting of a separate part connected to said web portion and being spaced axially remote from the axial end faces of the rollers to define a large space of such size that a relatively great quantity of lubricant can be contained therein for lifetime lubrication.

---

The present invention relates to a rolling bearing having a cage of the type having annular end portions interconnected by cross-bars between which the rolling bodies are located.

The invention is described as applied to a taper roller bearing but its use is in no way limited to this type of bearing. Conventional cages for such bearings comprise the above mentioned annular end portions, the one at the small ends of the rollers being turned inwards towards the small end of the inner race ring while that at the large ends of the rollers extends sideways in line with the cross-bars. A cage of this type snffers from certain disadvantages with respect to its lubrication since it is difficult to lubricate a bearing having a cage of this type so that effective lubrication can be maintained during a long period of time.

In order to eliminate these disadvantages it is proposed to provide a rolling bearing with a new type of cage which makes it possible to lubricate the bearing once for all. The bearing of the invention is characterized mainly thereby that it is provided with a cage having two annular portions which are both turned inwards towards the respective end portions of the inner race ring to form, at least at one side of the set of rolling bodies, a space of such size that a relatively great quantity of lubricant can be contained therein.

Figure 1:
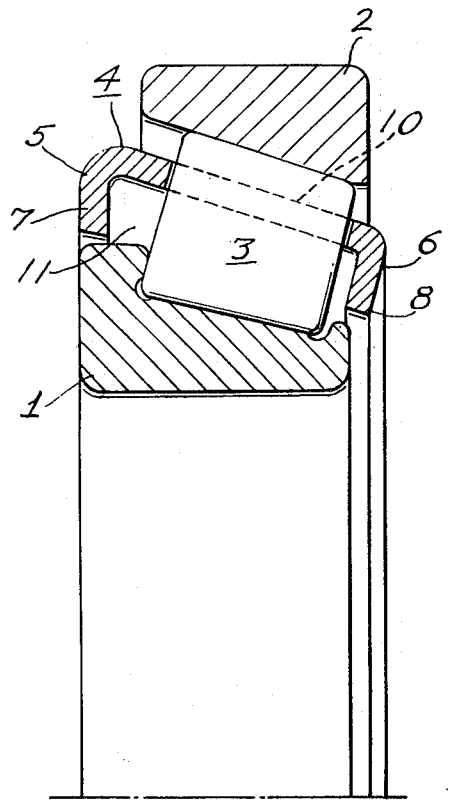
Figure 2:
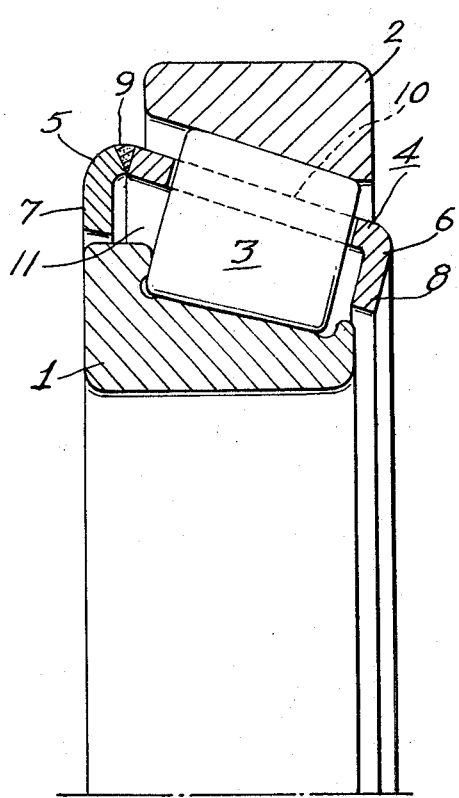

The invention is described in the following with reference to the accompanying drawing, wherein; FIG. 1 is a transverse sectional view of a taper roller bearing in accordance with the present invention; and FIG. 2 is a similar view of a modified form of roller bearing of FIG. 1.

The taper roller bearing shown comprises an inner race ring 1 and an outer race ring 2 between the conical races of which a set of conical rollers 3 is located. A cage 4 for the rollers is provided with annular portions 5 and 6 which are turned inwards towards the axis of the bearing to form flanges 7 and 8. The annular portions are interconnected by cross-bars 10 between which the rollers are located. The flange at the large ends of the rollers may also consist of a separately made part 7 which in a suitable manner is welded at 9 to the rest of the cage. (See FIG. 2.) An enclosed lubricant space 11 will thus be formed by the flange 7 at the large end of the rollers and this space can enclose and retain effectively a comparatively large amount of lubricant and the bearing may thus be lubricated before being mounted so that no subsequent lubrication will be required. The necessity of lubricating from time to time in order that the bearing may function properly has been a drawback with bearings having conventional cages. In bearings of this kind there will be wear at the large ends of the rollers and the flange of the inner race ring.

The space 11 will be kept filled with grease through the pumping effect when running and this will result in improved lubrication of the ends of the rollers and the flange of the inner ring with which they are in contact. A bearing according to the invention which has been lubricated once for all is preferably packed in a suitable plastic bag or the like which is well sealed so that the bearing will be protected from dirt or the like before being mounted. The plastic bag may remain covering the bearing during the first phase of the mounting operation and thus protects it from being contaminated with dirt.

As before mentioned the use of the invention is not limited to the type of bearing described but it may be applied to other types of rolling bearings within the scope of the following claim.

I claim:
1. A tapered rolling bearing assembly comprising inner and outer ring members having spaced apart raceways, a plurality of tapered rollers in the annular space between the ring members, a cage having an axial web portion with a plurality of circumferentially spaced window-like openings for spacing the rollers, said web portion being disposed above a plane through the center of rotation of the rollers toward the outer ring, a radially inwardly directed continuous flange projecting inwardly from opposite ends of said web portion and terminating closely to the inner ring adjacent opposite axial ends, one of said flanges at the large end of the rollers consisting of a separate part connected to said web portion and being spaced axially remote from the axial end faces of the rollers to define a large space of such size that a relatively great quantity of lubricant can be contained therein for lifetime lubrication.

References Cited

UNITED STATES PATENTS

| 1,909,617 | 5/1933  | Hektner | 308—218 |
| 2,063,587 | 12/1936 | Cox     | 308—218 |
| 1,966,923 | 7/1934  | Couch   | 308—187 |

FOREIGN PATENTS 247,420   2/1926   Great Britain.

FRED C. MATTERN, Jr., Primary Examiner
F. SUSKO, Assistant Examiner

U.S. Cl. X.R.
308—218